W. R. HUDSON.
BRAKE OPERATING MECHANISM.
APPLICATION FILED JAN. 26, 1917.
1,262,672.  Patented Apr. 16, 1918.
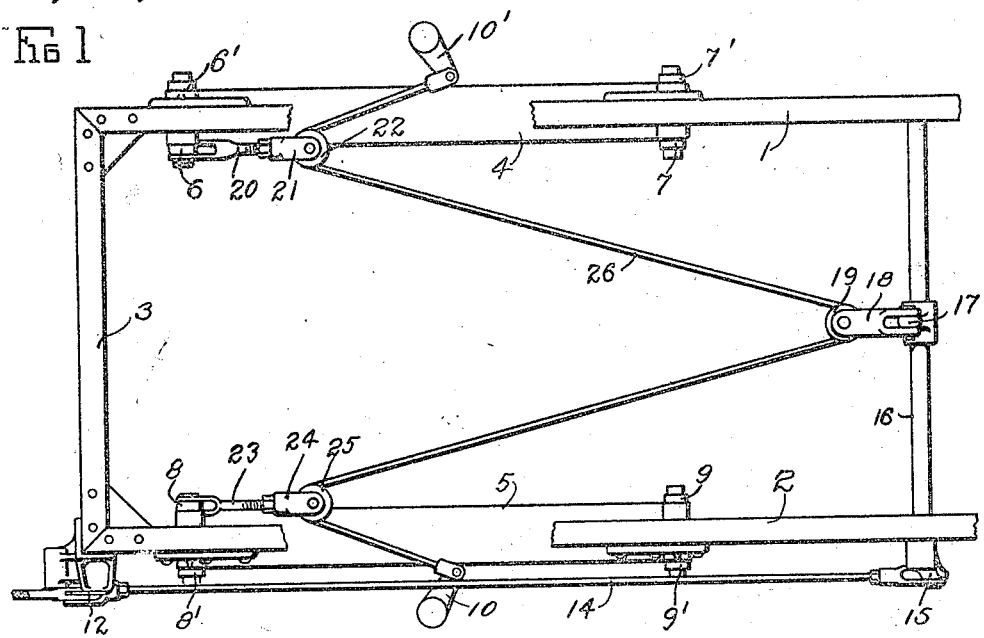
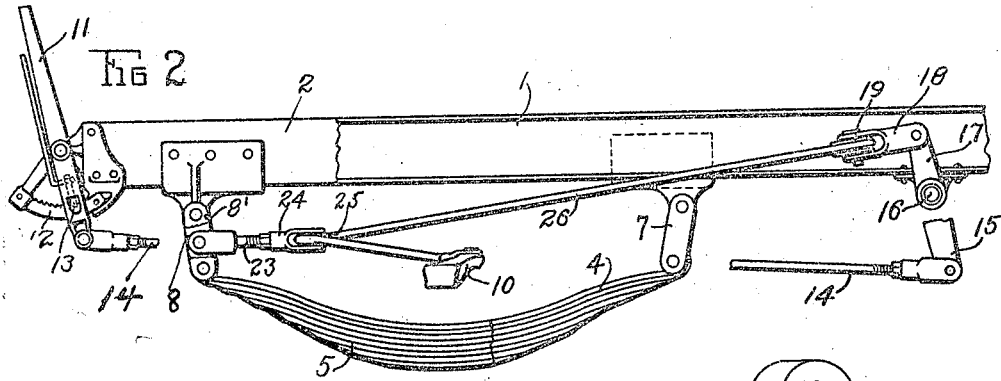
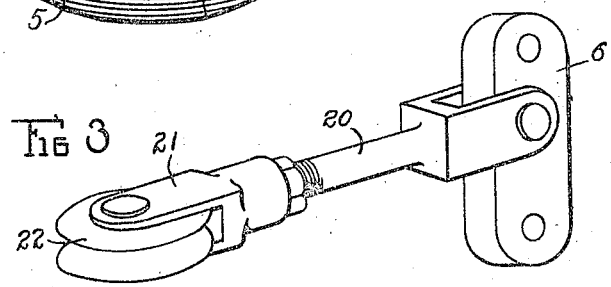

UNITED STATES PATENT OFFICE.

WARREN R. HUDSON, OF TROY, OHIO, ASSIGNOR TO THE TROY WAGON WORKS COMPANY, OF TROY, OHIO, A CORPORATION OF OHIO.

BRAKE-OPERATING MECHANISM.

1,262,672.  Specification of Letters Patent.  Patented Apr. 16, 1918.

Application filed January 26, 1917. Serial No. 144,675.

*To all whom it may concern:*

Be it known that I, WARREN R. HUDSON, a citizen of the United States, residing at Troy, in the county of Miami and State of Ohio, have invented certain new and useful Improvements in Brake-Operating Mechanism, of which the following is a specification.

This invention relates to improvements in brake operating mechanism and more particularly to a brake operating mechanism which is especially adapted for road vehicles in which the frame or body of the vehicle is supported upon springs.

The object of the invention is to provide a brake operating mechanism of the character referred to so constructed that the brakes will not be affected by relative movements of the vehicle body and the axle or wheels.

In the accompanying drawings:—

Figure 1 is a top plan view of so much of a vehicle body as is necessary to illustrate my improvements showing my improved brake operating mechanism applied thereto.

Fig. 2 is a side elevation of the same.

Fig. 3 is a perspective view of a portion of the mechanism.

In the present case the invention is shown applied to what is known as a trailer truck; that is, a truck designed to be hitched to and drawn by a motor vehicle. In the particular type of truck shown it is usual to support the body or frame upon shackled springs which allows the frame to have more or less movement relatively to the axle and wheels, not only vertically but longitudinally, which makes it impracticable to equip the vehicle with brakes having operating mechanism of the ordinary construction for the reason that the brakes proper are connected with the wheel while the operating mechanism is supported upon the frame. With brake operating mechanism as usually constructed, this results in the brakes being applied or let off at the movements of the vehicle body in passing over uneven ground and also results in breakage in the mechanism. In order to overcome this difficulty and provide an operating mechanism which will automatically adjust itself to the different relative movements of the vehicle body and the axle and wheels I have devised the following arrangement.

Referring to the drawings, 1 and 2 represent portions of the side frame of the vehicle and 3 one of the end connecting rails thereof all constructed in the usual way. The springs are represented by 4 and 5, the respective ends of which are connected to the frame by the shackles 6, 6', 7, 7', 8, 8', 9 and 9', it being observed that each end of each spring is shackled to the frame which allows the frame to have considerable longitudinal swinging movement relatively to the springs and also to the axle and wheels (not shown). The brake mechanism which is usually employed on these vehicles is of the usual kind employing drums connected to the wheels and internally expanding shoes in the drums, but I have simply shown the levers 10 and 10' which act upon the shoes and in turn are operated by the connections to a hand or foot lever, the peculiar form of which connections in the present case constitutes my improvements.

For the purpose of operating the brakes I have shown a hand lever 11 which may be located upon any suitable point of the frame, it being placed in the present case at one corner thereof and being provided with the usual notched segment 12 and pawl 13 to hold it in its operated position. The lower end of the lever is connected by a rod 14 with one end of a crank arm 15 connected with a rock shaft 16 which extends transversely across the frame and is journaled in suitable bearings on the under side of the respective rails 1 and 2. Connected to the rock shaft 16 at a point preferably midway between the rails 1 and 2 is a crank arm 17 to the free end of which is pivotally secured a block 18 carrying a pulley 19. Pivotally connected to the shackle 6 is a rod 20 upon which is threaded a block 21 carrying a pulley 22. Pivotally connected to the shackle 8 is a rod 23 upon which is threaded a block 24 carrying a pulley 25. Connected with the respective levers 10 and 10' and passing about each of the pulleys 22, 19 and 25 is a flexible cable 26.

As a result of this construction, vertical movements of the vehicle frame which cause the elongation and contraction of the springs, compel the shackles to swing about their pivotal connection with the frame, thus changing the position of the pulleys 22 and 25 enough to compensate for the slackening or tightening of the cable 26 by reason of the fact that the pulley 19 will approach or recede from the levers 10 and 10'; it being understood that as the frame moves downwardly the pulley 19 will be brought closer to the plane of the levers which slackens the cables 6, which slack is taken up by the swinging of the shackles 6 and 8 in the direction of the elongation of the springs, and as the frame moves upwardly again the reverse is true.

If the frame swings in a longitudinal direction with respect to the axle and wheels, this will cause the shackles 6 and 8 to swing upon their pivotal connections with the springs, thus moving the pulleys 22 and 25 in the direction that the frame swings. Assuming that the frame should swing two inches, the pulley 19 would likewise swing two inches, but the pulleys 22 and 25 would move but one inch due to the fact that the rod 23 is pivoted to the shackles midway their length, which movement, however, takes up the two inches slack in the cable on each side of the pulley 19.

Thus it will be seen that the brake operating mechanism automatically adjusts itself to all the movements of the frame relatively to the axle and wheels so as to keep the brakes uniformly on or off as the case may be.

Having thus described my invention, I claim:—

1. In a mechanism of the character described, a frame, springs for supporting said frame, shackles for pivotally connecting the ends of said springs to said frame, a brake operating member on each side of said frame with respect to which said frame is movable, a rotatable member connected to one of the shackles of each spring at one end of the machine, a rotatable member supported by the frame, a flexible member passing about all of said rotatable members and connected to said brake operating members, and means for swinging the rotatable member on said frame to cause said flexible members to operate said brake operating members.

2. In a mechanism of the character described, a frame, springs for supporting said frame, said springs and frame being pivotally connected together, a brake operating member on each side of said frame with respect to which said frame is capable of swinging in a longitudinal direction, and brake operating devices supported by said frame and consisting in part of a flexible cable together with pulleys about which said cable passes, two of said pulleys being connected at the pivotal points between said frame and springs and a third pulley at a point on said frame.

3. In a mechanism of the character described, a frame, springs for supporting said frame, said springs and frame being pivotally connected together whereby said frame may swing in a longitudinal direction, a brake operating member on each side of said frame, a crank arm pivotally supported on said frame together with devices for operating the same, a pulley connected with said crank arm and a pulley connected at each of the pivotal points between said springs and frame, and a flexible cable passing about said pulleys and connected to the respective brake operating members.

4. In a mechanism of the character described, a frame, springs for supporting said frame, together with shackles connecting the springs to said frame, a brake operating member with respect to which said frame is movable, and brake operating devices on said frame connected to said member comprising a flexible cable, pulleys about which said cable passes, one of said pulleys being pivotally connected with one of said shackles, for the purpose specified.

5. In a mechanism of the character described, a frame, springs for supporting said frame together with shackles between the springs and frame, a brake operating member with respect to which said frame is movable, an operating lever on said frame, a rock shaft on said frame connected to said lever, a pulley connected to said rock shaft, a second pulley centrally pivoted to one of said shackles, and a flexible cable about said pulleys and connected to said operating member.

6. In a mechanism of the charatcer described, a frame, springs for supporting said frame together with shackles between the ends of each spring and said frame, a brake operating member on each side of said frame with respect to which said frame is movable, an operating lever on said frame, a rock shaft on said frame to which said lever is connected, a pulley connected to said rock shaft, a pulley connected with a shackle on each side of said frame, and a flexible cable passing about said pulleys and connected with the respective brake operating members.

In testimony whereof, I have hereunto set my hand this third day of January, 1917.

WARREN R. HUDSON.

Witnesses:
L. H. SHIPMAN,
FLORENCE L. DE FREES.